R. DUNWODY.
THERMOMETER FOR TURPENTINE STILLS.
APPLICATION FILED MAR. 11, 1911.
1,035,953.
Patented Aug. 20, 1912.
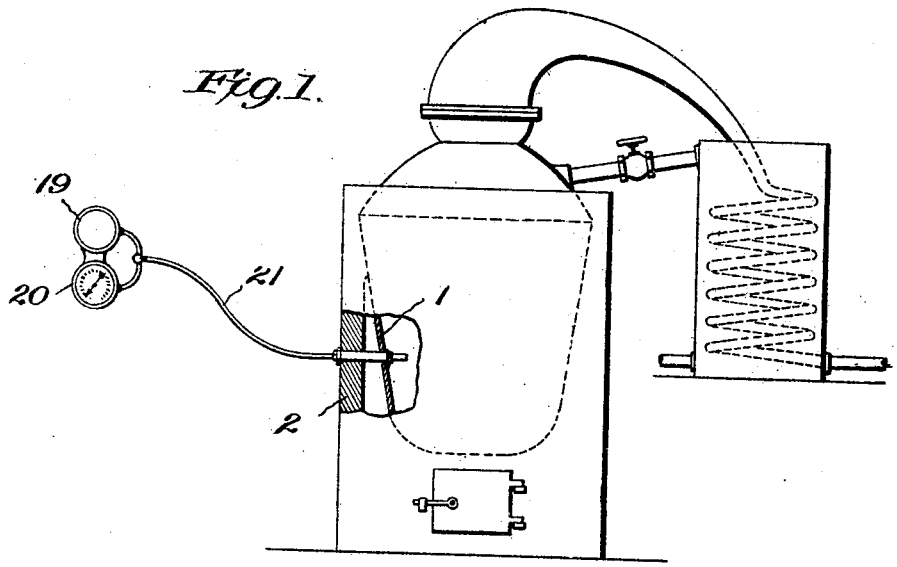
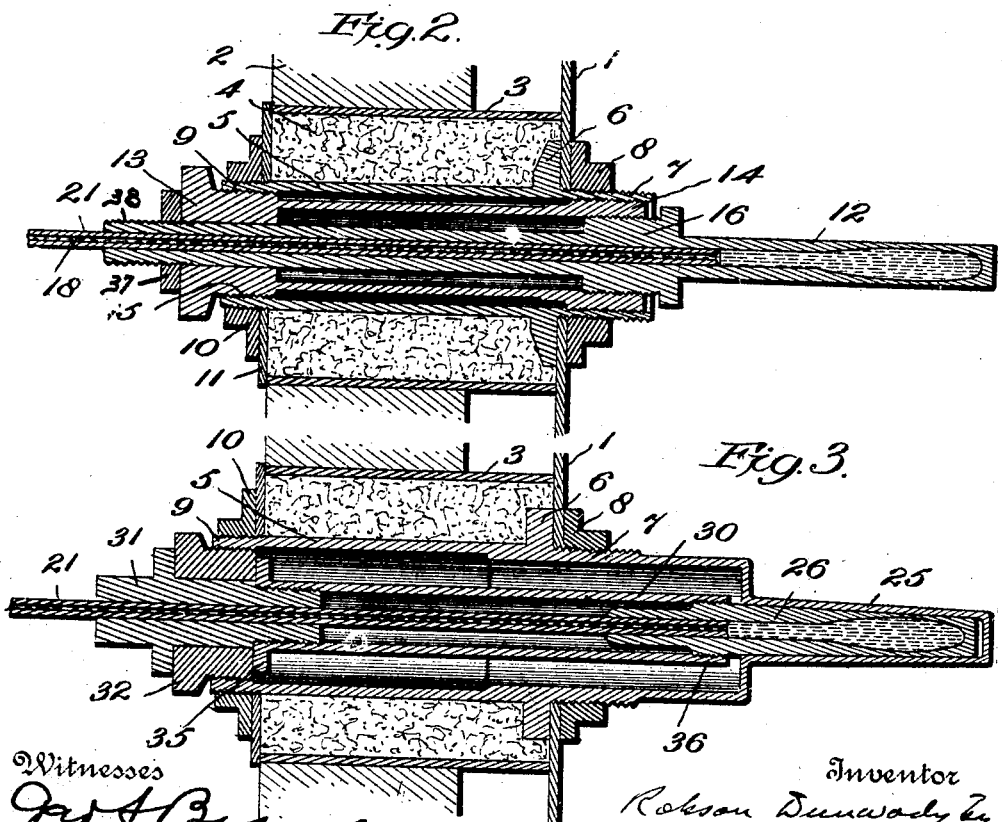

UNITED STATES PATENT OFFICE.

ROBSON DUNWODY, OF KIRKWOOD, GEORGIA, ASSIGNOR TO NEAL NAVAL STORES COMPANY, A CORPORATION OF GEORGIA.

THERMOMETER FOR TURPENTINE-STILLS.

1,035,953.   Specification of Letters Patent.   Patented Aug. 20, 1912.

Application filed March 11, 1911.  Serial No. 613,935.

*To all whom it may concern:*

Be it known that I, ROBSON DUNWODY, a citizen of the United States, residing at Kirkwood, in the county of Dekalb and State of Georgia, have invented certain new and useful Improvements in Thermometers for Turpentine-Stills; and I do hereby declare the following to be a full, clear, and exact description of the invention, such as will enable others skilled in the art to which it appertains to make and use the same.

This invention relates to thermometers especially adapted to be used in connection with turpentine stills, and has for its object to produce a thermometer of this character which will be simple in construction, efficient in operation; less expensive to construct than those heretofore proposed; and as a further improvement over the structure of thermometer disclosed in my co-pending application Serial No. 613,073, dated March 8th, 1911.

With these objects in view, the invention consists in the novel details of construction and combinations of parts more fully hereafter disclosed and particularly pointed out in the claims.

Referring to the accompanying drawings forming a part of this specification in which like numerals refer to like parts in all the views:—Figure 1 is a diagrammatic view in elevation partly broken away, of a still provided with my thermometer; Fig. 2 is a sectional detail view of the thermometer, and a portion of the wall of the still showing how the thermometer is secured in said wall; and, Fig. 3 is a view similar to Fig. 2, but showing a modified form of construction.

1 indicates the walls of any suitable still,
2 the masonry surrounding said walls, and 3 an outer casing passing through said masonry and extending to the walls 1 of the still, as shown.

4 indicates a packing of asbestos material or other suitable heat insulator, inclosed in the casing 3 and extending to the sleeve 5, which is provided with the shoulder 6 fitting against the wall 1 of the still. Said sleeve 5 is screw-threaded at its end 7, and
a lock nut 8 engages said screw-threaded end, fits firmly against the wall 1 and thereby holds the said sleeve 5 in place. The end 9 of said sleeve is likewise screw-threaded, as shown, and a lock nut 10 passes over said end 9 and firmly fits against a collar 11 fitted to the sleeve 3 and the masonry 2, as shown. It results from this construction that a firm and secure, heated insulated passage is provided through the masonry 2 and the wall 1, into the still, as shown. The thermometer 12 with the lock nut sleeve 13 surrounding the same, is next introduced through said passage, whereupon the said locking sleeve 13 is adjusted in place, until its extreme screw-threaded end 14 engages the internal screw threads at the end 7, and its screw threads 15 on its opposite end, engage the internal threads of the end 19 of said sleeve 5. A nut 37 screw threaded on the end 38 of the thermometer stem 12 jams against the end of the sleeve 13, and secures the thermometer in position. The end 14 of the locking sleeve 13 is further internally screw-threaded, and these latter screw threads are adapted to engage the screw-threaded enlargement 16 on the thermometer, as shown.

It results from the structure so far disclosed, when the thermometer and locking sleeve 13 are in place, and the latter firmly secured to the sleeve 5, that the parts are firmly held in position, and the resinous or other material in the still, will have a good contact with the thermometer, and therefore cause its mercury column 18 to indicate upon suitable instruments, such as 19 and 20, the correct temperature of the interior of the still.

The tube 21, as well as the bulb of the thermometer, is preferably made of metal, such as copper or steel, and therefore danger of breaking, which would be incident to glass or more brittle material, is voided, but in the form shown, when the sti..ing instruments come in contact with the bulb 12, there is a greater or less danger of the same being struck, and thereby loosening the joints between the parts 7, 14 and 16, and permitting a greater or less amount of leakage. This danger is further aggravated by the fact that these joints are subjected to the severe racking strains incident to frequent changes of temperature, and therefore, a means which will avoid these objections, and will at the same time preserve the other advantages of the structure just disclosed, is very desirable.

In order to combine the advantages of the structure disclosed in Fig. 2 with a structure which will prevent the bulb 12 from being injured by the contact of stirring instruments, I have provided the modified form of my invention shown in Fig. 3. In this modification, the screw-threaded end 7 of the sleeve 5 is provided with an internal tapered extension 25, and the bulb 26 of the thermometer is outwardly tapered to closely fit the interior of the extension 25, as shown. The extension 25 being closed, the insulated passage provided by the sleeve 5, constitutes a pocket extending into the still, and the interior walls of which are in intimate metallic contact with the bulb 26 throughout this extent, so that a good conducting path for the heat is provided through the walls of said extension 25, and of the bulb 26, as will be readily understood. In this construction it is of the utmost importance that no resinous material should, through leakage, enter the interior of the sleeve 5, for if it did, it would find its way into the point between the parts 25 and 26, and thereupon insulate the said joint and prevent the free passage of heat, which would of course in turn destroy the efficiency of the thermometer. Any leakage into the sleeve 5 is effectually prevented by making the lug 6 integral with said sleeve 5, and by making the extension 25 and screw-threaded portion 7, integral with said lug 6. It, therefore, results that any leakage past the locking nut 8 and the wall 1 would enter the asbestos packing 4 and fail to find an entrance into the sleeve 5 or into said joint.

In assembling the modified form of the invention shown in Fig. 3, the said sleeve 5 is brought to place, the lock nuts 8 and 10 adjusted on their respective screw-threaded nuts 7 and 9 of the sleeve, and the thermometer bulb with the sleeve 30 and plug 31, as well as the plug nut 32 in place, is inserted into the pocket of said sleeve, whereupon the bulb 26 is pushed as far home as possible, and the nut 32 is set up. The latter nut is thus utilized in driving the tapered bulb 26 into an intimate metallic contact of the extension 25, and thereby insures a tight metallic joint between said parts 25 and 26. The sleeve 30 is flanged as at 35, and is screw-threaded as at 36 to the thermometer bulb, so that said bulb is held firmly to the extreme end of the tube 21, and the hollow nut 32 is provided with a driving shoulder at the same time for the bulb 26. The said plug 31 is also screw-threaded to the sleeve 30, as shown, and as the tube 21 passes through its center, the whole structure makes an exceedingly firm and simple support for the tube 21 and bulb 26 when in use.

It is obvious that those skilled in the art may vary the details of construction and the arrangement of parts without departing from the spirit of my invention, and therefore I do not wish to be limited to such features except as may be required by the claims.

What I claim is:—

1. In a thermometer for stills, the combination of a sleeve adapted to enter the still; heat insulating material surrounding said sleeve; a thermometer stem and bulb adapted to project through said sleeve beyond the wall of said still; a sleeve surrounding said stem and screw-threaded to said bulb; and screw-threaded means for securing said bulb in position in said still, substantially as described.

2. In a thermometer for stills, the combination of a sleeve provided with an interiorly tapered, closed extension adapted to project into said still; means for securing said sleeve to the walls of said still; and a readily detachable thermometer having a tapered bulb adapted to fit the interior of said extension, whereby said thermometer may be readily removed without opening said still, substantially as described.

3. In a thermometer for stills, the combination of a sleeve provided with an interiorly tapered closed extension adapted to project into said still; a locking nut and lug associated with said sleeve for holding the same to the walls of said still; a readily removable thermometer having a tapered bulb adapted to fit said tapered extension; and a tubular nut fitting said sleeve for securing and adjusting said bulb, substantially as described.

4. In a thermometer for stills, the combination of a sleeve provided with an interiorly tapered closed extension adapted to project into said still; a locking nut and lug associated with said sleeve for holding the same to the walls of said still; a readily removable thermometer having a tapered bulb adapted to fit said tapered extension; a sleeve having a flanged end surrounding the stem of said thermometer and secured to the bulb thereof; and a tubular nut fitting said first named sleeve and coacting with said flanged end for securing and adjusting said bulb, substantially as described.

5. In a thermometer for stills, the combination of a sleeve provided with a closed interiorly tapered extension adapted to project into said still; means for securing said sleeve to said still; and a thermometer coacting with said sleeve provided with a tapered bulb fitting said extension, a flanged sleeve secured to said bulb; a tubular plug secured to said flanged sleeve; and an adjusting nut surrounding said plug, substantially as described.

In testimony whereof, I affix my signature, in presence of two witnesses.

ROBSON DUNWODY.

Witnesses:
T. A. WITHERSPOON,
R. M. PARKER.